United States Patent
Bauer et al.

(10) Patent No.: US 12,241,427 B2
(45) Date of Patent: *Mar. 4, 2025

(54) METHOD AND DEVICE FOR REGULATING THE PRESSURE OF THE COMBUSTION GAS AND/OR EXHAUST GAS OF A MACHINE

(71) Applicant: KRISTL, SEIBT & CO. GESELLSCHAFT M.B.H., Graz (AT)

(72) Inventors: Robert Bauer, Graz (AT); Stefan Lambert Hoelzl, Graz (AT); Klemens Kranawetter, Graz (AT)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 168 days.

This patent is subject to a terminal disclaimer.

(21) Appl. No.: 18/046,415

(22) Filed: Oct. 13, 2022

(65) Prior Publication Data
US 2023/0072972 A1    Mar. 9, 2023

Related U.S. Application Data

(63) Continuation of application No. 16/964,168, filed as application No. PCT/AT2019/060022 on Jan. 22, 2019, now Pat. No. 11,499,487.

(30) Foreign Application Priority Data

Jan. 22, 2018 (AT) .............................. A 50046/2018

(51) Int. Cl.
*G01M 15/09* (2006.01)
*F02D 41/00* (2006.01)
*F02D 41/14* (2006.01)

(52) U.S. Cl.
CPC ..... *F02D 41/0002* (2013.01); *F02D 41/1441* (2013.01); *F02D 41/1448* (2013.01); *G01M 15/09* (2013.01); *F02D 2200/0406* (2013.01)

(58) Field of Classification Search
CPC ............. F02D 2200/0406; F02D 41/32; F02D 41/0002; F02D 41/1441; F02D 41/1448; G01M 15/09

See application file for complete search history.

(56) References Cited

U.S. PATENT DOCUMENTS

| 4,471,742 A | 9/1984 | Kishi |
| 4,858,136 A | 8/1989 | Tanaka et al. |

(Continued)

FOREIGN PATENT DOCUMENTS

| DE | 4015818 A1 | 4/1991 |
| DE | 102007018623 B3 | 9/2008 |

(Continued)

OTHER PUBLICATIONS

ISA European Patent Office, International Search Report Issued in Application No. PCT/AT2019/060022, May 3, 2019, WIPO, 2 pages.

*Primary Examiner* — Gonzalo Laguarda
(74) *Attorney, Agent, or Firm* — McCoy Russell LLP

(57) ABSTRACT

A method and a device for regulating the pressure of the combustion gas and/or exhaust gas of a machine, in particular an internal combustion engine. The combustion gas is supplied to the machine via a supply line and is discharged via an exhaust gas line, and the supply line and/or the exhaust gas line has a regulating device, the regulating device delimiting a pressure-regulated section of the supply line and/or the exhaust gas line, and wherein the pressure in each pressure-regulated section is measured at more than one point.

20 Claims, 2 Drawing Sheets

(56) References Cited

U.S. PATENT DOCUMENTS

| | | | |
|---|---|---|---|
| 5,417,109 A | 5/1995 | Scourtes | |
| 6,279,551 B1 | 8/2001 | Iwano et al. | |
| 7,204,134 B2 * | 4/2007 | Matsuo | G01F 1/34 |
| | | | 73/114.33 |
| 7,801,691 B2 | 9/2010 | Panciroli et al. | |
| 9,995,652 B1 * | 6/2018 | Chen | F02D 41/0002 |
| 11,499,487 B2 * | 11/2022 | Bauer | F02D 41/144 |
| 2003/0084712 A1 | 5/2003 | Smith et al. | |
| 2016/0161322 A1 | 6/2016 | Jadhav et al. | |

FOREIGN PATENT DOCUMENTS

| | | |
|---|---|---|
| DE | 102009003285 A1 | 11/2010 |
| DE | 102011107876 A1 | 1/2013 |
| DE | 102015203636 B3 | 9/2016 |
| EP | 1600622 A2 | 11/2005 |
| EP | 1336035 B1 | 4/2015 |
| FR | 2919388 A1 | 1/2009 |
| GB | 2493749 A | 2/2013 |
| WO | 0242730 A2 | 5/2002 |

* cited by examiner

METHOD AND DEVICE FOR REGULATING THE PRESSURE OF THE COMBUSTION GAS AND/OR EXHAUST GAS OF A MACHINE

CROSS-REFERENCE TO RELATED APPLICATIONS

The present application is a continuation of U.S. Non-Provisional application Ser. No. 16/964,168, entitled "METHOD AND DEVICE FOR REGULATING THE PRESSURE OF THE COMBUSTION GAS AND/OR EXHAUST GAS OF A MACHINE", and filed on Jul. 22, 2020. U.S. Non-Provisional application Ser. No. 16/964,168 is a U.S. National Phase of International Patent Application Serial No. PCT/AT2019/060022, entitled "METHOD AND DEVICE FOR REGULATING THE PRESSURE OF THE COMBUSTION GAS AND/OR EXHAUST GAS OF A WORK MACHINE," and filed on Jan. 22, 2019. International Patent Application Serial No. PCT/AT2019/060022 claims priority to Austrian Patent Application No. A 50046/2018, filed on Jan. 22, 2018. The entire contents of each of the above-referenced applications are hereby incorporated by reference for all purposes.

TECHNICAL FIELD

The invention relates to a method for regulating the pressure of the combustion gas and/or exhaust gas of a machine, in particular an internal combustion engine, wherein the combustion gas is supplied to the machine via a supply line and is discharged via an exhaust gas line, and the supply line and/or the exhaust gas line has a regulating device, said regulating device delimiting a pressure-regulated section of the supply line and/or the exhaust gas line. The invention further relates to a device for regulating the pressure of the combustion gas and/or exhaust gas of a machine, preferably an internal combustion engine, particularly preferably in a test bench, comprising a supply line for supplying combustion gas to the internal combustion engine having a regulating device, preferably a regulating or throttle valve, which delimits a pressure-regulated section of the supply line, and/or an exhaust gas line for discharging exhaust gas from the internal combustion engine having a regulating device, preferably a regulating or throttle valve, which delimits a pressure-regulated section of the exhaust gas line.

BACKGROUND AND SUMMARY

It is often necessary to regulate the pressure of the combustion gas supplied to a machine, in particular an internal combustion engine, and/or the exhaust gas discharged, in particular during operation in a test bench. This is particularly necessary if the combustion gas is additionally conditioned with a high-pressure blower, a gas treatment section, in particular an air treatment section, an exhaust valve, a throttle valve and a pressure sensor, or the exhaust gas is regulated using a regulating valve or a throttle valve and a blower. A large number of possibilities are already known for this.

EP 1 600 622 B1, for example, shows a device for supplying an internal combustion engine with conditioned combustion gas, having a pressure sensor for detecting the engine intake pressure, wherein a dynamic pressure regulating unit having a discharge valve for discharging excess combustion gas is provided in the supply or intake line of the internal combustion engine, the dynamic pressure regulating unit being regulated as a function of the engine intake pressure detected by the pressure sensor, in such a way that the pressure of the combustion gas is constant as it enters the internal combustion engine.

Furthermore, DE 40 15 818 C2 discloses a test bench for internal combustion engines having a supply air system and an exhaust system which process the required combustion air under conditions which can be adjusted constantly, independently of the ambient conditions, and which are fluidically connected by a supply air line of the internal combustion engine. The exhaust gas line from the exhaust connection of the internal combustion engine to the exhaust system has a negligible flow resistance. Furthermore, a regulating valve is provided in the exhaust gas line, upstream of the blower in the direction of flow, and regulates an exhaust gas pressure in the section of the exhaust gas line upstream in the direction of flow, which exhaust gas pressure corresponds to the pressure of the supplied combustion air, the section of the exhaust gas line following the regulating valve in the direction of flow being kept always at a sufficient negative pressure by the blower.

U.S. Pat. No. 4,471,742 A shows a method for a fuel injection control system for an internal combustion engine, wherein a pressure in an intake line of the internal combustion engine is detected at a point downstream of a throttle valve by means of first and a second pressure sensor means.

DE 10 2009 003 285 A1 shows a method for the diagnosis of pressure sensors of an air supply of an internal combustion engine, wherein a first pressure sensor is assigned to a first sub-channel, a second pressure sensor to a second sub-channel, and a third pressure sensor to an intake channel.

DE 10 2007 018 623 B3 discloses a method for functional testing of a temperature sensor of an internal combustion engine. A first pressure sensor may be situated between a throttle valve and a compressor, and a second pressure sensor may be situated downstream of the compressor in the intake tract. The pressure sensors are used to determine whether the internal combustion engine is in charging or non-charging operation.

GB 2493748 A shows a unit for estimating the rotation speed of a turbocharger for an internal combustion engine. Various sections may each contain a pressure sensor, the signals of which are used to estimate the speed of rotation.

Furthermore, EP 1 336 035 B1 shows a method for supplying an internal combustion engine with a constant quantity of conditioned combustion gas, wherein combustion gas not required by the internal combustion engine is routed past the internal combustion engine and mixed with its exhaust gas, and the combustion gas/exhaust gas mixture is extracted downstream of the internal combustion engine. Furthermore, a pressure gradient between 0.3 and 5 mbar is set between the conditioned combustion gas and the exhaust gas downstream of the internal combustion engine. The quantity of combustion gas provided at any time at a branch point to the internal combustion engine or a bypass line around the internal combustion engine is at any time the maximum quantity required by the internal combustion engine, the combustion gas currently not required by the internal combustion engine being routed past the internal combustion engine via the bypass line.

As a result of the disclosed method, the mass flow over the regulating devices is approximately constant, which makes the regulation of these regulating devices relatively simple, and on the other hand the valves never have to close tightly. However, the proposed methods have several disadvantages.

For example, when a bypass line is used, feedback effects of pressure pulsations from the exhaust gas channel into the intake channel are possible. Furthermore, at operating points of the combustion engine with a low exhaust gas mass flow, the mass flow through the bypass line is large, which creates the risk of a mixing of exhaust gas and combustion gas in the exhaust gas channel. This is particularly relevant if exhaust gas analysers take samples from the exhaust gas channel. Furthermore, the internal combustion engine may draw in hot exhaust gas from the exhaust gas channel via the bypass line and thus be damaged or its operation considerably impaired. The other methods and devices disclosed in the prior art also have one or more disadvantages. If the pressure is regulated without a bypass line, as also described in the prior art, the regulating device on the intake and/or exhaust gas side must follow suitably quickly in the event of dynamic changes in the internal combustion engine. However, this is only insufficiently possible due to possible resonances and fluctuations with the prior art methods. Furthermore, at operating points of the internal combustion engine with low mass flow, for example at idling speed, it is necessary that the regulating devices are suitably sealed in order to build up and maintain the relevant pressure. While many suitable materials are available on the intake side for a tightly closing regulating device, especially a valve, due to the relatively low temperature of the conditioned combustion gas, this is much more difficult on the exhaust side due to the high exhaust gas temperatures. For reasons of robustness, it may even be necessary to use a non-sealing valve with a certain amount of leakage on the exhaust gas side, however this is an obstacle to keeping the pressure constant according to the prior art methods.

The object of the invention is thus to eliminate or mitigate the above-mentioned problems in particular and to simplify or improve the maintenance of constant pressure in the supply-side or exhaust-gas-side area of a machine, in particular an internal combustion engine.

This is achieved by a method for regulating the pressure of the combustion gas and/or exhaust gas of a machine as described at the outset, wherein the pressure in each pressure-regulated section is measured at more than one point. Furthermore, this is achieved by a device as described at the outset, wherein each pressure-regulated section has more than one pressure sensor, preferably three pressure sensors.

In principle, it would be advantageous to measure the pressure in the vicinity of each regulating device, since changes in the regulating device have an immediate effect on the pressure after the regulating device. However, a change in the setting of the regulating device not only causes a localised change in pressure, but also a pressure wave, which propagates at the speed of sound of the gas. This pressure wave is reflected at the machine and reaches the regulating device or the pressure sensor again after twice the cycle time. If the regulation reacts to this pressure wave with a valve adjustment, the regulation will excite an oscillation, which corresponds to the first or a higher resonance frequency of the pressure-regulated section, for example a pipe. For a 6 m long, air-filled pipe at room temperature, the first resonance frequency may be around 29 Hz, for example.

To prevent the regulation from exciting these resonance frequencies, there are several possibilities. For example, it is possible to adjust the regulation so slowly that it does not react to the first resonance frequency. However, this generally means that the regulation adjustment is too slow. Furthermore, it is possible to provide appropriate blocking or comb filters at the measured pressure value. This means, however, that the exact resonance frequencies must be known, which are dependent, however, on the temperature and the pipe length amongst other things. Furthermore, a pressure sensor could be used in the middle of the pressure-regulated section, because a standing wave of the first resonance has a node here. This means that the first resonance at the pressure sensor is eliminated and the regulation can be adjusted more acutely accordingly, but it must not react to the second resonance frequency. One of these possibilities or a combination thereof may also be provided in the method according to the invention.

By measuring the pressure at more than one point, the effects of resonances, fluctuations and pressure waves on the pressure measurement may be reduced or largely avoided.

In particular, the pressure-regulated section may represent a section within which the same pressure prevails steadily everywhere. Preferably, the more than one point at which the pressure is measured or the more than one pressure sensor is situated in the same (in particular uninterrupted) line and/or in a section within which substantially the same pressure prevails or would prevail steadily everywhere, and/or at points which are directly pressure-coupled or between which pressure waves may propagate unhindered, and/or at points at which substantially the same air flows are routed past. If the machine has more than one cylinder bank, preferably the pressure-regulated section of a cylinder bank, i.e. the line that leads air to a cylinder bank, has more than one pressure sensor, or the pressure in this line is measured at more than one point. It is advantageous to measure the pressure at the more than one point with the same pressure sensors or with pressure sensors with substantially the same resolution within the pressure range to be measured.

In a preferred embodiment of the method, this also includes the fact that the pressure in the pressure-regulated section is adjusted on the basis of a preferably weighted arithmetic mean value of the pressures measured at a plurality of points in the pressure-regulated section by regulation of the regulating device, the pressure in the pressure-regulated section preferably being kept substantially constant. By selecting special weights for the various pressure sensors, the resonance frequency that limits the bandwidth of the regulation may be as high as possible, which means that the regulation may be carried out in the shortest possible time intervals.

Preferably, the pressure regulation in a pressure-regulated section is carried out on the basis of a time mean value of the measured pressures, the mean value being formed over a period of time which is equal to or greater than a period of a resonance of a standing pressure wave in the pressure-regulated section in question, and preferably the pressure in the pressure-regulated section in question being kept substantially constant. The formation of the time mean value makes it possible to eliminate the possibly still relevant resonances, which depend on the number of pressure sensors, for the adjustment of the regulating devices.

In a preferred embodiment, the pressure in the pressure-regulated section is measured at exactly three points. Thus, the effort may be kept to a minimum and yet interfering factors may be largely eliminated.

When measuring at three points, it is particularly preferred that the first point be situated in an initial area of the pressure-regulated section in question, the second point substantially in the middle of the pressure-regulated section in question, and the third point in an end area of the pressure-regulated section in question. It has been shown that this choice is advantageous in eliminating resonances. Preferably, the initial area is situated as close as possible to the beginning of the pressure-regulated section in question, i.e. as close as possible to the point where exhaust gas from the machine is supplied, and/or the final area is situated as close as possible to the end of the pressure-regulated section in question, i.e. as close as possible to the regulating device. For the pressure-regulated section of the supply line, the beginning shall in particular be that point at which the pressure-regulated section is connected to the regulating device of the supply line. For the pressure-regulated section of the exhaust gas line, the beginning is defined in particular as the point where the pressure-regulated section is connected to the machine. For the pressure-regulated section of the supply line, the end of the section shall be the point at which the pressure-regulated section is connected to the machine. For the pressure-regulated section of the exhaust gas line, the end is in particular the point at which the pressure-regulated section is connected to the regulating device of the supply line. Preferably, the initial area extends from the beginning of the pressure-regulated section in question to a point which is less than 30 cm, particularly preferably less than 10 cm from this point, and/or the end area extends from a point which is less than 30 cm, particularly preferably less than 10 cm from the end of the pressure-regulated section in question, to the end of the pressure-regulated section in question.

Furthermore, the pressure in the pressure-regulated section in question is set particularly preferably on the basis of an arithmetic mean value of the pressure at the first, second and third points, the pressure of the first point being weighted by a quarter, the pressure of the second point by a half, and the pressure of the third point by a quarter when forming the mean value. The first, second and third resonances are eliminated by the specific selection of the weights. Only the fourth resonance has an effect on the pressure wave, this being well above 100 Hz for example in the case of a 6 m long, air-filled pipe at room temperature, and thus usually no longer has a negative effect on the pressure regulation. In addition, a time mean value is preferably formed over a period of time which is equal to or greater than the period of the fourth resonance of a standing pressure wave in the pressure-regulated section in question, whereby the fourth and higher resonances no longer influence the measurement.

In a further variant of the method, the pressure in the pressure-regulated section in question is measured at five or seven points, which could eliminate all resonances up to the seventh or ninth point, for example by suitable selection of the points and/or weightings.

It is particularly advantageous if a throttle valve and/or a regulating valve is used as a regulating device.

The regulation on the exhaust gas side and on the supply gas side follows similar principles in essence. However, there is a significant difference in the resonance frequencies. While the temperature on the intake side is known due to the usual conditioning of the combustion gas, the temperature of the exhaust gas may change rapidly—depending on the operating point of the machine, and therefore a solution with the aid of a blocking filter or comb filter on the exhaust gas side would be much more difficult to implement. Nevertheless, in accordance with the invention, both supply-side and exhaust-gas-side barrier or comb filters may be provided in the pressure-regulated section.

Combustion gas, preferably air, is preferably blown into the supply line with a first gas conveying device, particularly preferably a high-pressure blower, and a primary pressure is generated, and the exhaust gas in the exhaust gas line is drawn off by a second gas conveying device, particularly preferably a blower. Furthermore, the combustion gas in a gas treatment section, for example an air treatment section, is particularly preferably conditioned with regard to temperature and moisture and/or the primary pressure is regulated by means of a discharge valve and/or combustion gas not required by the machine is discharged. In this way, conditioning and the most accurate setting possible of supply and exhaust gas parameters may be achieved.

At operating points of the machine with low mass flow, for example at idling speed, the regulating devices must be suitably sealed in order to build up and maintain the required pressure. This may be particularly difficult in respect of exhaust gas due to the high temperatures, and for reasons of robustness it may be advisable to deliberately use a non-sealing regulating device with a certain leakage. To ensure that the desired pressure on the exhaust gas side may be accumulated despite leakage, a preferably small additional mass flow must be fed upstream of the regulating device. It is therefore advantageous that in the pressure-regulated section of the exhaust gas line the pressure is further regulated, preferably kept constant, by a mass flow from a compressed gas line, the mass flow preferably being provided by a domestic pressure line, another gas source, particularly preferably an air source, or another compressor. It is advantageous here if the mass flow from the compressed gas line is regulated by a manually and/or electrically operated valve and/or a throttle. It is preferable that the gas is supplied with a mass flow which is lower than the mass flow of the exhaust gas discharged from the machine in maximum operation, the mass flow preferably being less than 5 percent, particularly preferably less than 10 percent of the mass flow of the exhaust gas discharged from the machine in maximum operation.

Since the compressed gas connection is regulatable in relation to the mass flow, the additional mass flow may advantageously also be completely shut off with increasing throughput through the machine.

As an alternative, in a preferred variant, the gas conveying arrangement on the intake side may also be used to provide the gas in the pressure gas line. In this case, gas is fed via the compressed gas line from a section of the supply line upstream of the regulating device of the supply line to the pressure-regulated section of the exhaust gas line, the mass flow being preferably regulated with a valve and/or a throttle in the compressed gas line, and the compressed gas line preferably having a high flow resistance. Between the supply line upstream of the pressure-regulated section and the pressure-regulated section of the exhaust gas line there is preferably a pressure gradient of at least 50 mbar, particularly preferably of at least 100 mbar. The compressed gas line preferably has a correspondingly high flow resistance, so that the mass flow from the compressed gas line is kept low despite the high pressure difference between the beginning of the compressed gas line and the pressure of the exhaust gas in the exhaust gas line, in particular as the pressure within the pressure-regulated section. Preferably, the flow resistance should be so large that, at a pressure difference of more than 50 mbar, the mass flow from the compressed gas line into the pressure-regulated section is less than 10 percent, preferably less than 5 percent, of the exhaust gas discharged from the machine in maximum operation. Particularly preferably, the flow resistance shall be such that, at a pressure difference of more than 100 mbar, the mass flow from the compressed gas line into the pressure-regulated section is less than 10 percent, preferably less than 5 percent, of the exhaust gas discharged from the machine during maximum operation. It is also preferable if the compressed gas line has a correspondingly small diameter, so that the mass flow from the compressed gas line is kept low despite the high pressure difference, the diameter preferably being so small that the preferred and particularly preferred properties mentioned in connection with the flow resistance are achieved. In this way, the problem of mixing of exhaust gas and combustion gas in the exhaust gas channel at operating points of the combustion engine with low exhaust gas mass flow is eliminated, since the mass flow via the compressed gas line is considerably smaller than with a bypass line which directly connects the pressure-regulated section of the supply line and that of the exhaust gas line. With reference to the device according to the invention, the supply line is advantageously equipped with a first gas conveying device, preferably a high-pressure blower. Furthermore, the supply line preferably has a gas treatment section and/or a discharge valve. Further advantageously, the exhaust gas line is equipped with a second gas conveying device, preferably a blower.

In a preferred embodiment of the device, the pressure-regulated section of the exhaust gas line has a compressed gas line. Particularly preferably, the compressed gas line has a valve and/or a throttle. Also particularly preferably, the compressed gas line has a correspondingly high flow resistance, so that the mass flow from the compressed gas line is kept low despite the high pressure difference between the beginning of the compressed gas line and the pressure of the exhaust gas in the exhaust gas line, in particular as the pressure within the pressure-regulated section. Preferably, the flow resistance should be so large that, at a pressure difference of more than 50 mbar, the mass flow from the compressed gas line into the pressure-regulated section is less than 10 percent, preferably less than 5 percent of the exhaust gas discharged from the machine during maximum operation. Particularly preferably, the flow resistance should be so high that, at a pressure difference of more than 100 mbar, the mass flow from the compressed gas line into the pressure-regulated section is less than 10 percent, preferably less than 5 percent of the exhaust gas discharged from the machine during maximum operation. It is also preferred if the compressed gas line has a correspondingly small diameter so that the mass flow from the compressed gas line is kept low despite the high pressure difference, the diameter preferably being so small that the preferred and particularly preferred properties mentioned in conjunction with the flow resistance are achieved.

In a further preferred embodiment, the supply line is connected to the compressed gas line upstream of the regulating device. Here, the pressure drop across the compressed gas line is preferably more than 50 mbar, particularly preferably more than 100 mbar.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The invention will be explained in greater detail below by means of preferred exemplary embodiments as shown in the drawings, to which the invention is by no means limited. In detail, the drawings show.

DETAILED DESCRIPTION

Figure 1:
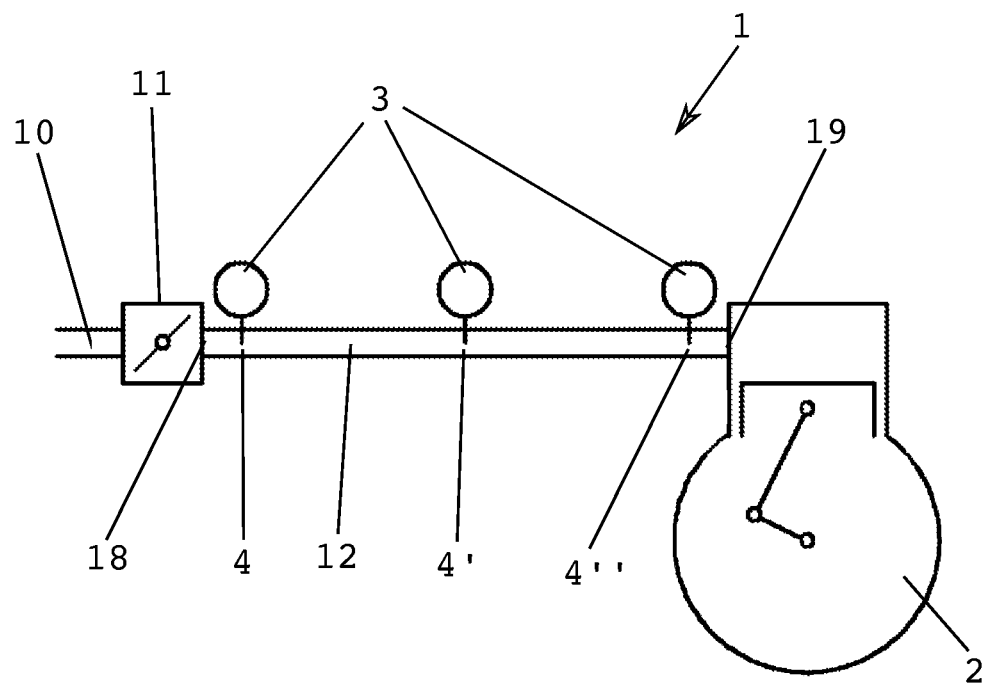
FIG. 1 a preferred embodiment of the supply-gas-side part of the device for regulating the pressure of the combustion gas and/or exhaust gas of a machine with three pressure sensors.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows an embodiment of the supply-gas-side part of the device 1 for regulating the pressure of the combustion gas and/or exhaust gas of a machine 2. Here, combustion gas is supplied to the machine 2 via a supply gas line 10. A supply-gas-side regulating device 11 delimits a pressure-regulated section 12 of the supply gas line 10. The pressure is measured at three points 4, 4', 4" of the pressure-regulated section 12 by pressure sensors 3. A first point 4 is situated in an initial area of the pressure-regulated section 12, a second point 4' is situated substantially in the middle of the pressure-regulated section 12, and a third point 4" is situated in an end area of the pressure-regulated section 12. The first point 4 is preferably as close as possible to the beginning 18 of the pressure-regulated section, and the third point 4" is as close as possible to the end 19 of the pressure-regulated section.

The pressure in the pressure-regulated section 12 is advantageously adjusted on the basis of an arithmetic mean value of the pressure at the first, second and third points 4, 4', 4", wherein, when forming the mean value, the pressure of the first point 4 is weighted by a quarter, the pressure of the second point 4' by a half, and the pressure of the third point 4" by a quarter, a time mean value being formed over a period of time which is equal to or greater than the period of a fourth resonance of a standing pressure wave in the pressure-regulated section 12.

Figure 2:
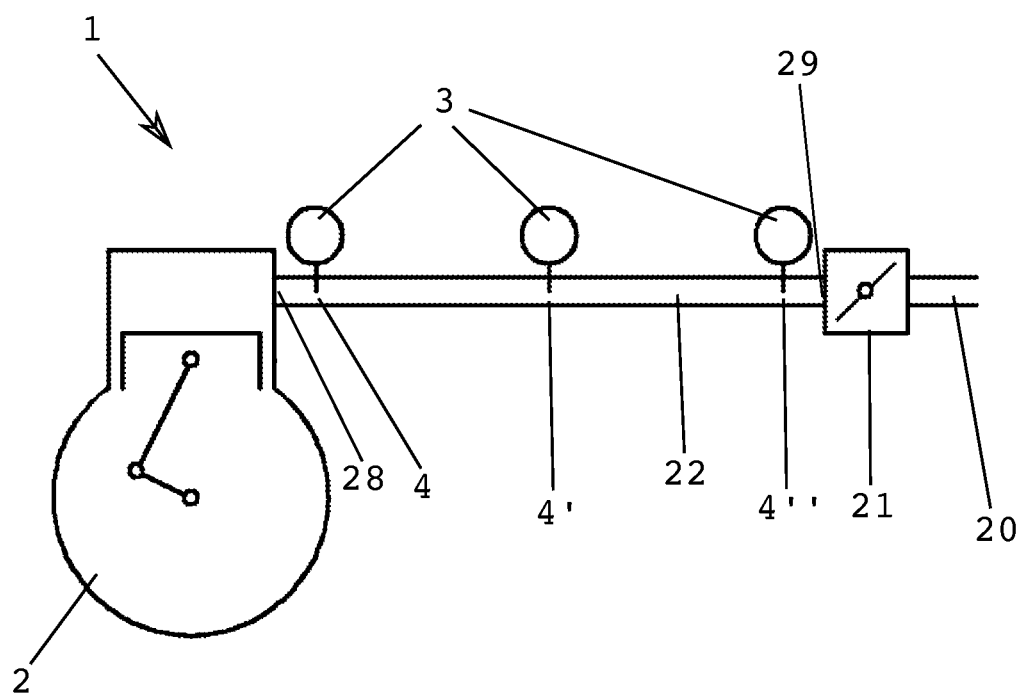
FIG. 2 a preferred embodiment of the exhaust-gas-side part of the device for regulating the pressure of the combustion gas and/or exhaust gas of a machine with three pressure sensors.

FIG. 2 shows an embodiment of the exhaust-gas-side part of the device 1 for regulating the pressure of the combustion gas and/or exhaust gas of a machine 2. Here, combustion gas is supplied to the machine 2 via an exhaust gas line 20. A regulating device 21 on the exhaust gas side delimits a pressure-regulated section 22 of the exhaust gas line 20. The further execution of the invention is carried out as explained in conjunction with FIG. 1. The first point 4 is preferably as close as possible to the beginning 28 of the pressure-regulated section, and the third point 4″ is as close as possible to the end 29 of the pressure-regulated section.

Figure 3:
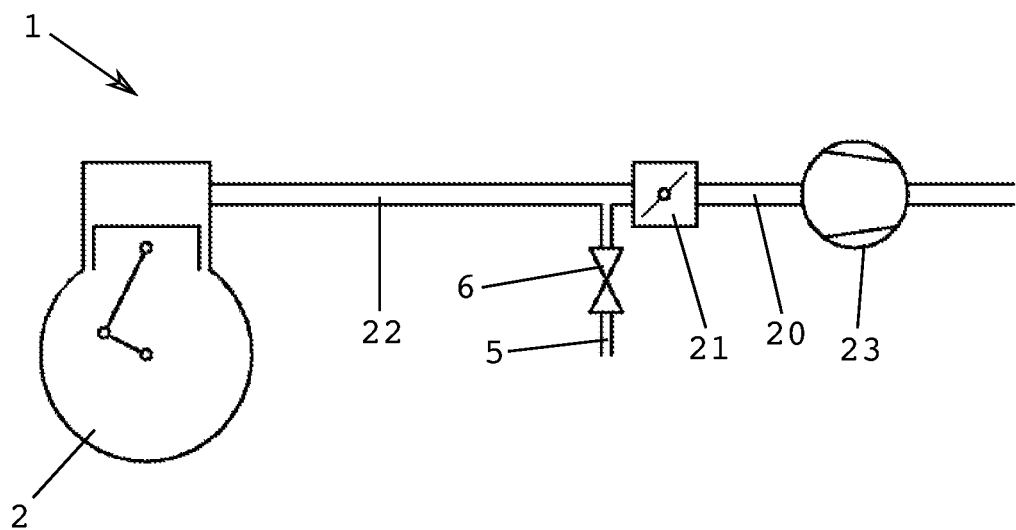
FIG. 3 a preferred embodiment of the exhaust-gas-side part of the device for regulating the pressure of the combustion gas and/or exhaust gas of a machine with a compressed gas line.

FIG. 3 shows a preferred embodiment of the exhaust-gas-side part of the device 1 according to the invention, wherein again the exhaust gas of the machine 2 is discharged via the exhaust gas line 20, in which the pressure regulation is carried out on the basis of a pressure measurement at a number of points 4, 4′, 4″(not shown). Furthermore, the device has a compressed gas line 5 with a throttle or a valve 6, wherein the compressed gas line 5 advantageously has a high flow resistance. Furthermore, the exhaust gas line 20 has a gas conveying device 23, preferably a blower, with which the exhaust gas is extracted. The compressed gas line 5 is advantageously situated as close as possible to the regulating device 21. Via the regulating device, a small gas mass flow is provided, for example from a domestic pressure line, another gas source, particularly preferably an air source, or another compressor, which contributes to the fact that the pressure in the pressure-regulated section 22 can be kept substantially constant if necessary despite a leakage of the regulating device 21.

Figure 4:
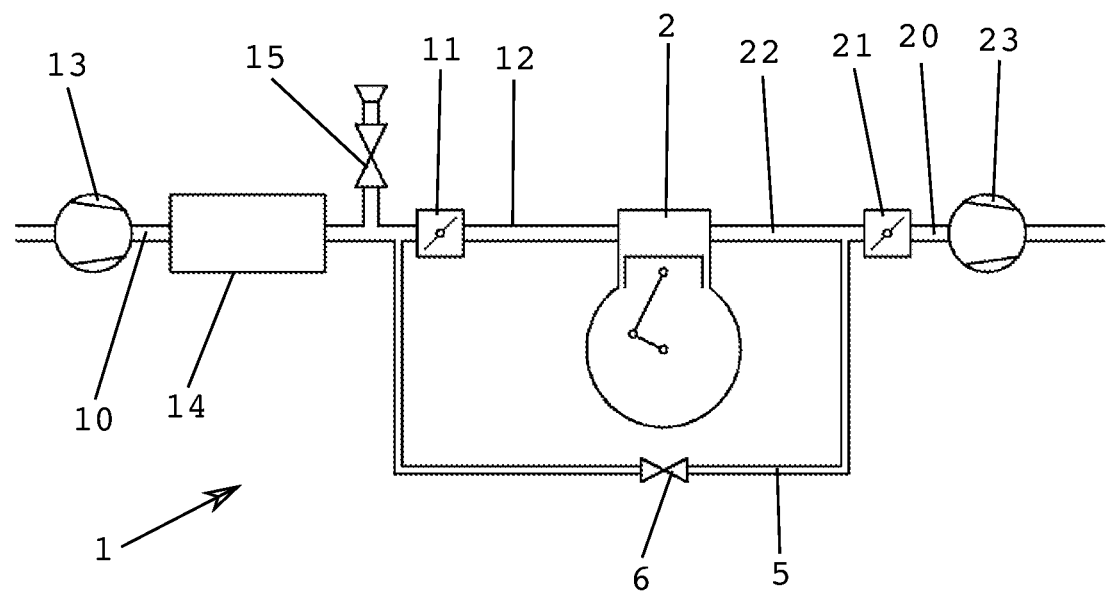
FIG. 4 a preferred embodiment of the device for regulating the pressure of the supply and exhaust gas of a machine with a compressed gas line connected to the supply gas line and with a gas treatment section.

FIG. 4 shows a preferred embodiment of the device 1 according to the invention for regulating the pressure of the combustion gas and/or exhaust gas of a machine 2. Here, the supply gas line 10 has a first gas conveying device 13, preferably a high-pressure blower, a gas treatment section 14 and a discharge valve 15. The gas conveying device 13 blows combustion gas into the supply gas line 10, which is then conditioned in the gas treatment section 14. The primary pressure is regulated via the discharge valve 15, and combustion gas not required by the machine 2 is discharged before the combustion gas passes through the regulating device 11 of the supply line 10 into the pressure-regulated section 12.

The exhaust gas line 20 again has a regulating device 21, which delimits a pressure-regulated section 22, and a second gas conveying device 23. A compressed gas line 5, having a throttle or a valve 6, connects the supply line 10 upstream of the regulating device 11 to the pressure-regulated section 22 of the exhaust gas line 20, the pressure gradient across the compressed gas line 5 preferably being more than 50 mbar, particularly preferably more than 100 mbar. For the point of connection of the pressure gas line 5 to the supply line 10, the same requirements as mentioned above relative to the regulating device 21 of the exhaust gas line 20 may also apply relative to the regulating device 11 of the supply line 10.

Via the compressed gas line 5, gas is fed from a section of the supply line 10 upstream of the regulating device 11 of the supply gas line 10 to the pressure-regulated section 22 of the exhaust gas line 20, the mass flow being regulated by a valve or throttle 6 in the compressed gas line 5.

The exemplary embodiments shown in the figures and explained in conjunction with them serve to explain the invention and are not limiting for the invention.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A method for regulating pressure of a combustion gas and/or exhaust gas of a machine, the combustion gas being supplied to the machine via a supply line and being discharged via an exhaust gas line, the supply line and/or the exhaust gas line having a regulating device, the regulating device delimiting a pressure-regulated section of the supply line and/or of the exhaust gas line, the pressure-regulated section including a length along which is a plurality of positions,
wherein
in the respective pressure-regulated section the pressure is measured at more than one position of the plurality of positions along the length of the respective pressure-regulated section, the pressure in the respective pressure-regulated section being adjusted on the basis of a weighted arithmetic mean value of the pressures measured at the more than one position in the respective pressure-regulated section by regulation of the regulating device delimiting the respective pressure-regulated section.

2. The method according to claim 1, wherein the pressure in the respective pressure-regulated section is kept constant.

3. The method according to claim 1, wherein the pressure regulation in the pressure-regulated section in question is carried out on a basis of a time mean value of the measured pressures, the mean value being formed over a period of time which is equal to or greater than a period of a resonance of a standing pressure wave in the pressure-regulated section in question.

4. The method according to claim 1, wherein the pressure in the pressure-regulated section is measured at exactly three positions.

5. The method according to claim 4, wherein of the exactly three positions a first position is situated in an initial area of the pressure-regulated section in question, a second position is situated substantially in a middle of the pressure-regulated section in question, and a third position is situated in an end area of the pressure-regulated section in question.

6. The method according to claim 5, wherein the pressure in the pressure-regulated section in question is adjusted on a basis of an arithmetic mean value of the pressure at the first, second and third positions, the pressure of the first position being weighted by a quarter, the pressure of the second position by a half, and the pressure of the third position by a quarter when forming the mean value.

7. The method according to claim 1, wherein the pressure in the pressure-regulated section in question is measured at five or seven positions.

8. The method according to claim 1, wherein combustion gas is blown into the supply line with a first gas conveying device, and a primary pressure is generated, wherein the combustion gas in a gas treatment section is conditioned with regard to temperature and moisture and a primary pressure is regulated by means of a discharge valve and/or combustion gas not required by the machine is discharged before the combustion gas reaches the regulating device of the exhaust gas line, and wherein the exhaust gas in the exhaust gas line is discharged by a second gas conveying device.

9. The method according to claim 8, wherein in the pressure-regulated section of the exhaust gas line the pressure is further regulated by a mass flow from a compressed gas line.

10. The method according to claim 9, wherein gas is fed via the compressed gas line from a section of the supply gas line upstream of the regulating device of the supply line to the pressure-regulated section of the exhaust gas line, the compressed gas line having a flow resistance which is substantially or at least so large that, if the pressure of the gas supplied at the beginning of the compressed gas line and the pressure of the exhaust gas in the exhaust gas line differ by more than 50 mbar, the mass flow from the compressed gas line into the pressure-regulated section is less than 10 per cent of the exhaust gas discharged from the machine during maximum operation.

11. The method of claim 1, wherein the machine comprises an internal combustion engine in a test bench.

12. The method according to claim 1, wherein the pressure in the respective pressure-regulated section is adjusted on the basis of a weighted arithmetic mean value of the pressures measured at the same time point at the more than one position in the respective pressure-regulated section by regulation of the regulating device delimiting the respective pressure-regulated section.

13. A device for regulating pressure of a combustion gas and/or exhaust gas of a machine, comprising:

a supply line for supplying combustion gas to the machine with a regulating device which delimits a pressure-regulated section of the supply line, the pressure-regulated section including a length along which is a plurality of positions, and/or an exhaust gas line for discharging exhaust gas from the machine with a regulating device which delimits a pressure-regulated section of the exhaust gas line, the pressure-regulated section including a length along which is a plurality of positions, wherein the pressure-regulated section of the supply line has more than one pressure sensor with different ones of the more than one pressure sensor located at different ones of the plurality of positions along the length of the pressure-regulated section and the regulating device of the supply line is configured to adjust the pressure in the pressure-regulated section of the supply line on the basis of a weighted arithmetic mean value of the pressures measured by the more than one pressure sensor in the pressure-regulated section of the supply line, and/or the pressure-regulated section of the exhaust gas line has more than one pressure sensor with different ones of the more than one pressure sensor located at different ones of the plurality of positions along the length of the pressure-regulated section and the regulating device of the exhaust gas line is configured to adjust the pressure in the pressure-regulated section of the exhaust gas line on the basis of a weighted arithmetic mean value of the pressures measured by the more than one pressure sensor in the pressure-regulated section of the exhaust gas line.

14. The device according to claim 13, wherein the supply line has a first gas conveying device and the exhaust gas line has a second gas conveying device.

15. The device according to claim 14, wherein the pressure-regulated section of the exhaust gas line has a compressed gas line.

16. The device according to claim 15, wherein the supply line is connected to the compressed gas line upstream of the regulating device, the pressure drop across the compressed gas line being more than 50 mbar.

17. The method of claim 8, wherein the first gas conveying device and the second gas conveying device each comprise a high pressure blower.

18. The device of claim 13, wherein the machine comprises an internal combustion engine in a test bench.

19. The device of claim 13, wherein the regulating device for the supply line and/or the exhaust gas line comprises a regulating or throttle valve.

20. The device of claim 14, wherein the first gas conveying device and the second gas conveying device each comprise a high pressure blower.

\* \* \* \* \*